O. L. CASTLE.

Arithmometer.

No. 229.

A. I. Patented Apr. 19, 1859.

Witnesses.
N. A. Boyd
E. M. Shuall.

Inventor:
O. L. Castle

THE NORRIS PETERS CO., PHOTO-LITHO., WASHINGTON, D. C.

UNITED STATES PATENT OFFICE.

ORLANDO L. CASTLE, OF UPPER ALTON, ILLINOIS.

IMPROVED ARITHMOMETER FOR ADDITION.

Specification of Additional Improvement No. 229, dated April 19, 1859, forming a part of Letters Patent No. 21,941, dated November 2, 1858.

*To all whom it may concern:*

Be it known that I, ORLANDO L. CASTLE, of Upper Alton, in the county of Madison and State of Illinois, have invented a new and useful Improvement in Arithmometers for Adding Numbers; and I do hereby declare the following to be a full and exact description.

My improvement greatly simplifies my original invention set forth in the schedule of Letters Patent dated November 2, 1858, by dispensing with all that is therein described, except the register-box B with its contents, and communicating rotary motion to the register-wheels in succession, directly, by means of a pawl engaging with notches in their peripheries instead of indirectly through the intervention of an intermediate driving-wheel D, as therein set forth. The wheels of the register remaining, essentially, the same as in the original description are simply enlarged in diameter, so that their peripheries may receive two, three, four, or more sets of figures, instead of one, as therein described, all the corresponding parts within being correspondingly increased—that is to say, the teeth of the ratchet-wheels S S and the recesses $u'$ $u'$ in the stationary plates $u$ $u$ being multiplied in number two, three, four, or more times, according to the number of sets of figures upon the wheels. The spur-wheel $q$ is entirely dispensed with.

I now proceed to describe my improvement more particularly, reference being had to the accompanying drawings, in which—

Figure 2:
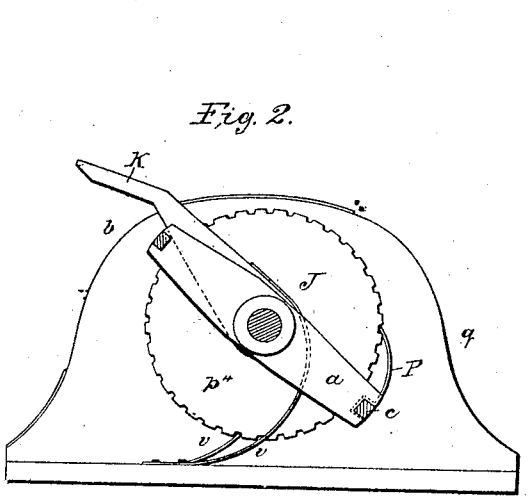
Figure 4:
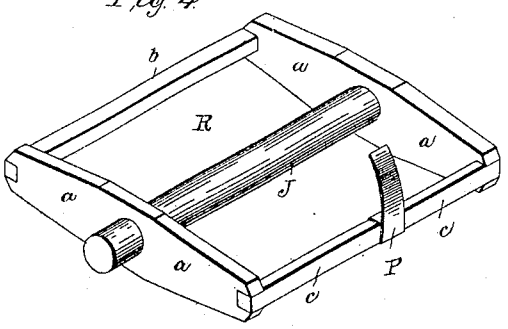
Figure 1:
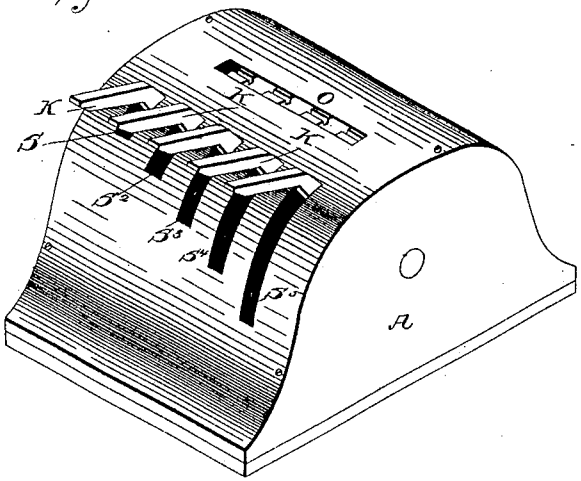
Figure 3:
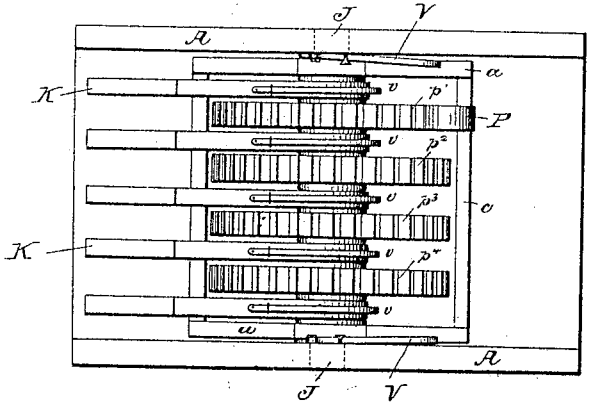

Figure 1 is an oblique perspective view of the outer case. Fig. 2 is an end view, the outer casing of the end being removed. Fig. 3 is a vertical view, the top casing being removed. Fig. 4 is a detail view of the "rocker."

A is the case containing the register and the mechanism for operating it, with an opening $o$ at the top for observing the register, and another $q$, at the back side for adjusting the pawl P, and with slots $S'$ $S^2$ $S^3$ $S^4$ $S^5$, &c., in the front side for the keys F F, &c., to work in.

$p'$ $p^2$ $p^3$ $p^4$, &c., are the wheels of the register, four of which are here represented revolving about the stationary shaft J as a center of motion, and having notches cut in their peripheries between the figures to receive the end of the pawl P. The order and arrangement of the wheels are the same as originally described.

$a$ $a$ are double arms pierced through their centers by the shaft J, which arms, with the cross-bars $b$ and $c$, firmly secured to their extremities, as seen in Fig. 4, form a frame R, spanning the register in the direction of the axis J and movable to and fro about it, and which, from the rocking motion imparted to it in operation, I denominate the "rocker." The cross-bar $c$ passes through the eye of the pawl P, which is made to slide along it longitudinally, so as to be brought opposite to each of the wheels of the register in succession at will, and which, engaging with the notches cut in their peripheries, serves to give forward motion to the wheel opposite to it whenever the rocker R is rocked about its axis of motion.

K K K, &c., are the keys, of which only five out of the ten are here represented, being simple levers of the second order passing between the register-wheels and having the shaft J as their center of motion, and working in the slots $S'$ $S^2$ $S^3$, &c., at their opposite extremities, with simply sufficient projection without the slots for convenience in manipulating them, and just within the slots they cross at right angles the cross-bar $b$, so as to depress it, and consequently give motion to the rocker R whenever either of the keys is depressed. The distance to which any key may be depressed is regulated by the length of the slot in which it works, these lengths being so graduated as to allow the first key to move through an arc corresponding with one space upon the register-wheels, the second two spaces, the third three, and so on. Each key has its spring $v$ $v$ to bring it to the top of the slot when released from depression, and the rocker R has springs V V to bring the cross-bar $b$ up against the keys when released from depression.

It is proper to remark here that in practice the keys must have a center of motion different from and outside of the axis of motion J of the register, in order not to interfere with interior mechanism for carrying the tens originally described. All that is designed by the present arrangement is to illustrate in the simplest possible manner the operation of a set of keys in giving motion to the rocker and thus to the register-wheels. A swinging bail also, instead of the cross-bar *b*, will be found to operate better than the firmly-fixed bar.

The mode of adjusting the register and of performing the additions is the same as that originally described, except that in passing from the addition of numbers of one denomination to those of the next higher or lower it is only necessary to slide the pawl P along the cross-bar *c* till it is opposite that part of the register corresponding to the required denomination, fix it there, and then proceed as before.

I do not claim the use of any particular kind or arrangement of keys; but

I claim—

The combination of the rocker, keys, and shifting pawl in any equivalent manner, and for the purposes set forth.

O. L. CASTLE.

Witnesses:
N. A. BOYER,
E. M. THRALL.